April 15, 1941.     S. KNEASS, JR     2,238,814
VALVE
Filed Oct. 19, 1939     3 Sheets-Sheet 1

INVENTOR
STRICKLAND KNEASS, JR.
BY *Albert G. Blodgett*
ATTORNEY

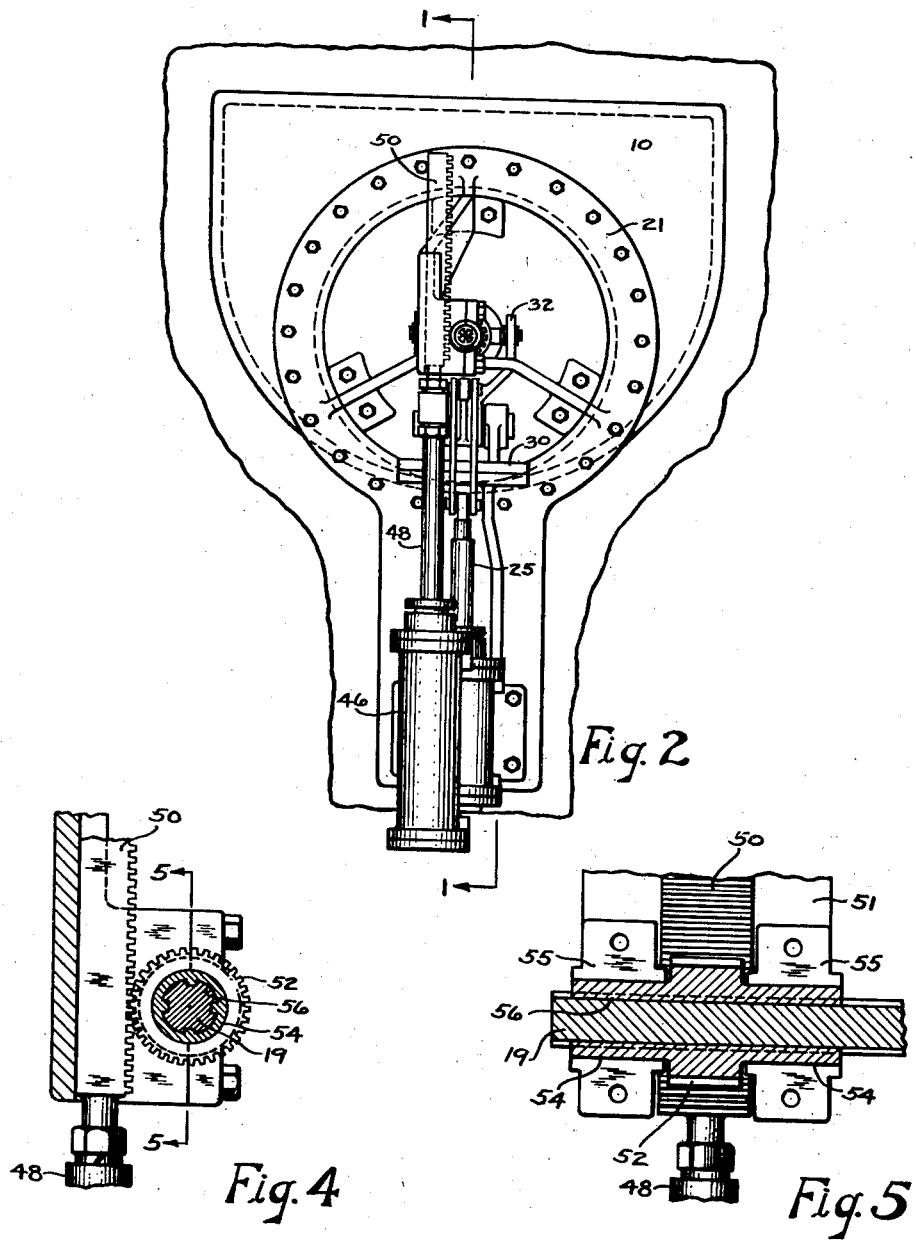

Patented Apr. 15, 1941

2,238,814

UNITED STATES PATENT OFFICE 2,238,814

VALVE

Strickland Kneass, Jr., Worcester, Mass., assignor to Morgan Construction Company, Worcester, Mass., a corporation of Massachusetts Application October 19, 1939, Serial No. 300,135

2 Claims. (Cl. 137—139)

This invention relates to valves, and more particularly to valves of the type having two relatively movable parts one of which provides an opening for the flow of fluid and the other of which forms a valve member adapted to prevent flow through the opening when desired.

Valves of this general type are well-known, and have been used heretofore for controlling various fluids. Certain difficulties arise, however, when such valves are used to control producer gas or similar fluids which carry tar, soot, or other impurities in suspension. Such foreign matter becomes deposited on the various parts and may prevent the valve from closing tightly. The resultant leakage may cause explosions or other disastrous happenings.

It is accordingly the main object of the invention to provide a valve which can be tightly closed to prevent leakage despite the deposit of foreign matter from the controlled fluid.

It is a further object of the invention to provide a valve particularly suitable for the control of producer gas or similar fluids carrying tar, soot, or other impurities in suspension, and adapted to be tightly closed despite the deposit of such matter on the cooperating surfaces of the valve.

With these and other objects in view, as will be apparent to those skilled in the art, the invention resides in the combination of parts set forth in the specification and covered by the claims appended hereto.

In accordance with my invention in its preferred form, I provide a valve having two cooperating parts one of which provides an opening for the flow of fluid, with a seat surrounding the opening, and the other of which forms a valve member adapted to engage the seat and close the opening. These parts are relatively movable so that the valve may be opened and closed, and provision is made to effect a relative sliding movement between the parts as the closed position is approached, at a rate independent of the speed of approach, whereby any deposited foreign matter may be either forced from between the parts or at least spread out in a substantially uniform manner to form a seal. Preferably I provide a stationary annular valve seat and an axially reciprocable circular valve member which cooperates therewith, with operating mechanism for the valve member arranged to turn said member about its axis as it approaches the seat and thereby bring about the desired sliding or rubbing action.

Referring to the drawings illustrating one embodiment of the invention and in which like reference numerals indicate like parts, Fig. 1 is a vertical section through a valve, taken approximately on the line 1—1 of Fig. 2, with the valve in its closed position;

Fig. 2 is an elevation of the valve, taken in the direction of the arrow 2 in Fig. 1;

Fig. 4 is an enlarged section on the line 4—4 of Fig. 1;

Fig. 5 is a section on the line 5—5 of Fig. 4; and

Figure 1:
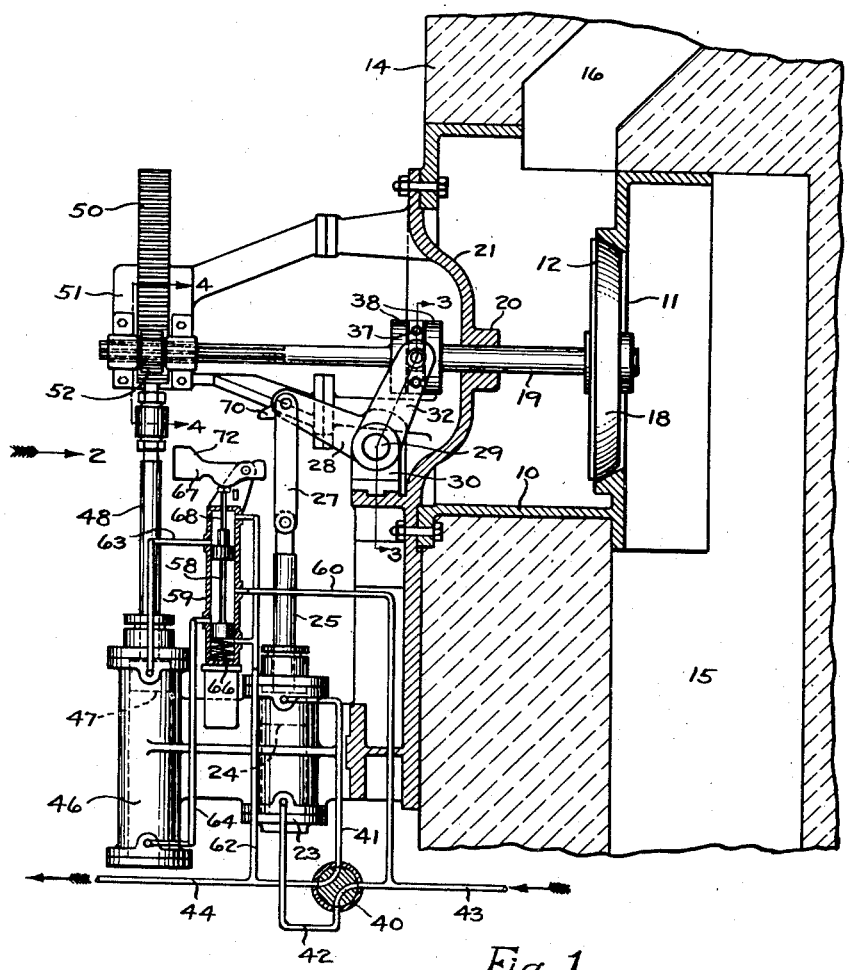

The embodiment illustrated comprises a valve body or casing 10 shaped to provide a circular port or opening 11 surrounded by an annular valve seat 12. This casing 10 is mounted in a wall 14 of refractory material in which there is provided an inlet passage 15 and an outlet passage 16. These parts are so constructed and arranged that producer gas or other fluid may flow upwardly through the inlet passage 15 and thence through the port 11 into the interior of the casing 10, which communicates directly with the outlet passage 16. The flow through the port 11 is controlled by means of a valve member 18 in the form of a circular disk mounted on the inner end of a horizontal rod or stem 19. The stem 19 is coaxial with the disk and extends outwardly through a bearing 20 formed in a frame 21, this frame being secured to the outer side of the valve body 10 and providing a closure therefor.

Figure 3:
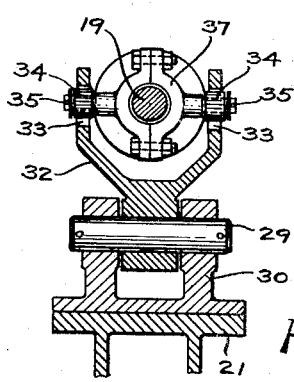
Fig. 3 is an enlarged section on the line 3—3 of Fig. 1.

Means is provided to slide the valve stem 19 through the bearing 20 and thereby reciprocate the valve member 18 axially to and from the seat 12. For this purpose there is provided a motor comprising a vertical cylinder 23, a piston 24 slidable therein, and a piston rod 25 extending upwardly from the piston. The upper end of the rod 25 is connected by a link 27 to one arm of a bell crank lever 28 which is fulcrumed on a horizontal pin 29 carried by a bracket 30 mounted on the frame 21. The other arm of the bell crank lever is formed as a U-shaped yoke 32 which extends upwardly on both sides of the valve stem. This yoke is provided with openings 33 (Fig. 3) to receive rollers 34 carried by pins 35 which extend horizontally from a collar 37, this collar surrounding the valve stem between a pair of axially spaced flanges 38 (Fig. 1) formed thereon. For convenience in assembly, the collar 37 is manufactured in two pieces which are bolted together. In order to control the movements of the piston 24, there is shown a four-way valve 40 of the rotary-plug type connected by pipes 41 and 42 to the upper and lower ends respectively of the cylinder 23. The valve 40 is supplied with a suitable pressure fluid, such as water, through a pipe 43, and an exhaust pipe 44 is likewise connected to the valve. With the valve 40 in the position shown in Fig. 1, fluid will be admitted to the lower end of the cylinder 23 and exhausted from the upper end, so that the piston 24 will be raised, and the port 11 will be closed by the disk 18.

With the parts as so far described, tar and soot carried in suspension by the producer gas will be deposited on the valve seat 12 and on the disk 18 when the valve is open. This deposit will not be a uniform one, but on the contrary it may be very irregular. Consequently, when an attempt is made to close the valve this foreign matter will hold the disk away from the seat and allow considerable leakage between these parts throughout portions of the circumference. In order to overcome this difficulty, the disk is turned about its axis as it approaches the seat, so that the disk will either cut through the deposited foreign matter and make actual contact with the seat or spread the foreign matter around the circumference with substantial uniformity to provide an effective seal between the parts. For this purpose there is shown a second motor comprising a vertical cylinder 46, a piston 47 slidable therein, and a rod 48 extending upwardly from the piston. The rod 48 is connected to the lower end of a vertical rack 50 which is slidably supported in a guideway formed by a bracket 51 mounted on the frame 21. This rack meshes with a pinion 52 having two hubs (Fig. 5) which are rotatably supported in bearings 55 in the bracket 51. The pinion and its hubs are formed with a multiple-splined bore 56 through which the outer portion of the valve stem 19 extends. This portion of the valve stem is shaped to fit the bore 56 so that it may slide therethrough but cannot rotate relative to the pinion.

Figure 6:
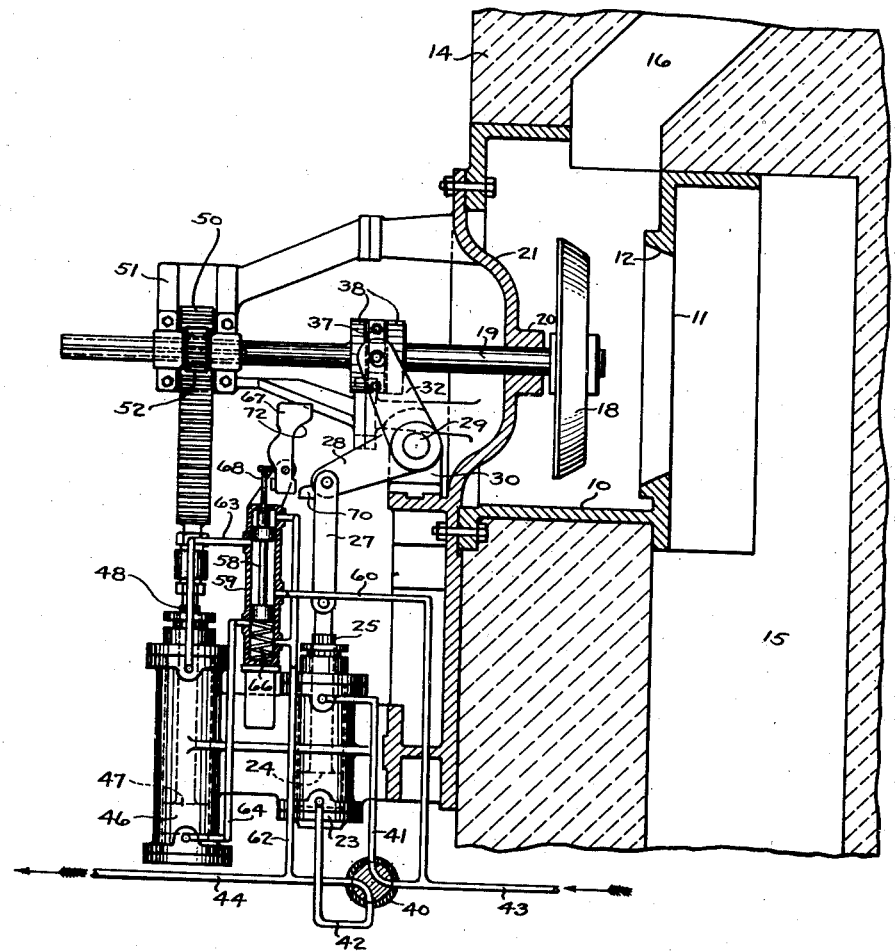
Fig. 6 is a view similar to Fig. 1, but showing the valve in its open position.

The movements of the piston 47 are controlled by means of a four-way pilot valve mechanism comprising a valve 58 slidable vertically in a casing 59. Fluid under pressure is supplied to the central portion of this casing by a pipe 60 leading from the pipe 43, and the end portions of the casing communicate with the exhaust pipe 44 through a pipe 62. The upper and lower ends of the cylinder 46 are connected by pipes 63 and 64 respectively to the valve casing 59. These various parts are so arranged that when the valve 58 is in its lower position, as shown in Fig. 1, fluid will be admitted through pipe 64 to the lower end of the cylinder 46, and the piston 47 will be in its raised position. When the valve 58 is raised to the position shown in Fig. 6, fluid will be admitted to the upper end of the cylinder 46, and the piston 47 will be in its lower position.

Means is provided to reverse the valve 58 automatically as the main valve 18 approaches its closed position, and thereby bring about the desired rotation of the main valve. For this purpose a coiled compression spring 66 is mounted in the lower end of the casing 59 to urge the valve 58 upwardly, and a lever 67 is fulcrumed at the upper end of the casing and weighted at one end to engage a stem 68 projecting upwardly from the valve 58 and force the valve downwardly against the pressure of the spring. A lug 70 projects outwardly from the link 27 in such a manner as to engage the short or unweighted end of the lever 67 during downward movement of the link, and to engage a cam surface 72 on the long or weighted end of the lever. Thus during upward movement of the piston 24 the lever 67 will swing counterclockwise into the position shown in Fig. 1, whereas during downward movement of this piston the lever will swing clockwise into the position shown in Fig. 6.

The operation of the invention will now be apparent from the above disclosure. Assuming that the parts are in the positions shown in Fig. 6, with the main valve 18 open, gas will flow upwardly from the passage 15 and thence through the port 11 to the outlet passage 16. Soot and tar will be deposited from the gas stream on the valve 18 and its seat 12. When it is desired to close the main valve, the four-way valve 40 will be turned to the position shown in Fig. 1, admitting fluid from the pipe 43 through the pipe 42 to the lower end of the cylinder 23. This will raise the piston 24, which will act through the rod 25, link 27 and bell crank lever 28 to slide the valve stem 19 and main valve 18 inwardly toward closed position. Shortly before the valve reaches its closed position the lug 70 will engage the cam surface 72 and tip the lever 67 in a counterclockwise direction, causing it to drop on the valve stem 68 and force the valve 58 downwardly in opposition to the pressure of the spring 66. This will admit fluid through the pipes 60 and 64 to the lower end of the cylinder 46, raising the piston 47, rod 48 and rack 50. The rack will rotate the pinion 52, and this rotation will be transmitted through the valve stem 19 to the main valve 18. This rotation of the main valve during its final closing movement will cause the valve to either cut entirely through the deposited soot and tar or at least spread this deposited material substantially uniformly around the circumference of the valve seat. In either event a tight and leak-proof seal is obtained. Since the rate of rotation of the valve member about its axis is independent of the speed at which it approaches its seat, the desired rubbing action will take place even though the deposited foreign matter is of such a nature as substantially to prevent further closing movement. During such rotation, the piston 24 will urge the valve member yieldingly toward closed position. When the main valve is to be opened again, the four-way valve 40 will be moved to the position shown in Fig. 6, admitting fluid through the pipe 41 to the upper end of the cylinder 23. This will force the piston 24 downwardly, and through the action of the bell crank lever 28 the main valve will be moved outwardly. During the downward movement of the link 27 the lug 70 will engage the short arm of the lever 67 and tilt it in a clockwise direction into the upright position shown in Fig. 6, where it will remain. This will allow the spring 66 to force the valve 58 upwardly, admitting fluid through pipe 63 to the upper end of the cylinder 46, and causing the piston 47 and the rack 50 to be lowered to their initial positions.

The entire construction is relatively simple and inexpensive, and thoroughly dependable. Because of the rugged nature of the mechanism and its adaptability for remote control, it is well suited for installation in comparatively inaccessible places.

Having thus described my invention, what I claim as new and desire to secure by Letters Patent is:

1. A valve comprising means providing an annular valve seat which surrounds an opening for the flow of fluid, a circular valve member mounted for reciprocation along its axis into or out of contact with the seat to control the flow through the opening, a motor arranged to reciprocate the valve member, a second motor arranged to turn the valve member about its axis, and means to bring the second motor into action as the valve member approaches the seat.

2. A valve comprising means providing an annular valve seat which surrounds an opening for the flow of fluid, a circular valve member mounted for reciprocation along its axis into or out of contact with the seat to control the flow through the opening, a fluid pressure actuated motor arranged to reciprocate the valve member, a second fluid pressure actuated motor connected to the valve member to turn the same about its axis, a control valve for the second motor, and means to actuate the control valve to admit pressure fluid to the second motor as the valve member approaches the seat.

STRICKLAND KNEASS, Jr.